US009583096B2

(12) United States Patent
Agapi et al.

(10) Patent No.: US 9,583,096 B2
(45) Date of Patent: Feb. 28, 2017

(54) ENHANCING ENVIRONMENT VOICE MACROS VIA A STACKABLE SAVE/RESTORE STATE OF AN OBJECT WITHIN AN ENVIRONMENT CONTROLLED BY VOICE COMMANDS FOR CONTROL OF VEHICLE COMPONENTS

(75) Inventors: Ciprian Agapi, Lake Worth, FL (US); Musaed A. Almutawa, Delray Beach, FL (US); Oscar J. Blass, Boynton Beach, FL (US); Patrick M. Commarford, Delray Beach, FL (US); Roberto Vila, Hollywood, FL (US)

(73) Assignee: Nuance Communications, Inc., Burlington, MA (US)

( * ) Notice: Subject to any disclaimer, the term of this patent is extended or adjusted under 35 U.S.C. 154(b) by 1378 days.

(21) Appl. No.: 11/464,512

(22) Filed: Aug. 15, 2006

(65) Prior Publication Data

US 2008/0046251 A1 Feb. 21, 2008

(51) Int. Cl.
*G10L 21/00* (2013.01)
*G10L 15/07* (2013.01)
*G10L 15/26* (2006.01)

(52) U.S. Cl.
CPC ............ *G10L 15/07* (2013.01); *G10L 15/265* (2013.01)

(58) Field of Classification Search
CPC .................................... G10L 15/265
USPC .................................. 704/275, 243
See application file for complete search history.

(56) References Cited

U.S. PATENT DOCUMENTS

| 3,207,252 | A | * | 9/1965 | Cripe et al. ............... 180/174 |
| 5,592,385 | A | * | 1/1997 | Katayama et al. ......... 701/93 |
| 5,873,064 | A | | 2/1999 | De Armas et al. |
| 6,219,644 | B1 | | 4/2001 | VanBuskirk |
| 6,230,138 | B1 | | 5/2001 | Everhart |
| 6,263,375 | B1 | | 7/2001 | Ortega |
| 6,477,500 | B2 | | 11/2002 | Maes |
| 6,496,107 | B1 | * | 12/2002 | Himmelstein ........... 340/426.1 |
| 6,587,824 | B1 | * | 7/2003 | Everhart et al. .......... 704/275 |
| 6,816,837 | B1 | * | 11/2004 | Davis ........................ 704/275 |
| 6,865,471 | B2 | * | 3/2005 | Konishi et al. ............. 701/93 |
| 2002/0135618 | A1 | | 9/2002 | Maes et al. |
| 2002/0163544 | A1 | | 11/2002 | Baker et al. |
| 2002/0198721 | A1 | * | 12/2002 | Weiser ....................... 704/275 |
| 2004/0054538 | A1 | | 3/2004 | Kotsinadelis |

FOREIGN PATENT DOCUMENTS

| JP | 2002259113 | 9/2002 |
| WO | 9957648 | 11/1999 |

* cited by examiner

*Primary Examiner* — Farzad Kazeminezhad
(74) *Attorney, Agent, or Firm* — Wolf, Greenfield & Sacks, P.C.

(57) ABSTRACT

A method for state transition in voice systems including: generating one or more stackable state macros, each of the one or more stackable state macros including a plurality of commands; saving the current state before executing another macro; enabling restoring the previous state after a plurality of commands is completed, allowing a user to utter voice commands to restore the individual state of components or the voice systems as a whole to the previous state or to a known home state. The method further utilizes voice commands not specific to the current state and is used specifically for automatically controlling a plurality of components of a vehicle.

10 Claims, 6 Drawing Sheets

ENHANCING ENVIRONMENT VOICE MACROS VIA A STACKABLE SAVE/RESTORE STATE OF AN OBJECT WITHIN AN ENVIRONMENT CONTROLLED BY VOICE COMMANDS FOR CONTROL OF VEHICLE COMPONENTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Field of the Invention

This invention relates to voice systems, and particularly to a method for generating, saving, and restoring stackable state macros in voice systems.

Description of Background

Currently, in-vehicle voice systems allow one or more users to speak individual commands in order to execute a single action that might otherwise require the use of a user's hands and/or eyes. For example, the voice commands "raise window" or "mute radio" may be recited by a user, and the user expects the system to execute such commands. However, these voice commands do not allow the ability to make a set of modifications to accommodate changes in the user's context.

For example, when a driver of a vehicle pulls up to a tollbooth, the driver may desire to perform the following tasks: turn the wipers off, roll down the driver's window, and turn off or mute the vehicle radio. Then, when the driver pulls back out of the tollbooth, the driver may desire to return all those actions back to a previous state.

Traditional systems allow one or more users to issue a series of commands to accomplish these goals and allow for the creation of a set of voice commands that each execute a series of actions prompted by the one or more users. Each user/system speech turn requires cognitive resources and introduces an opportunity for speech and/or recognition errors. One solution proposed by traditional systems is abstracting a set of system responses. However, proposed state transitions are problematic.

Considering the limitations of the aforementioned methods, it is clear that there is a need for an efficient method for generating, saving, and restoring stackable state macros in voice systems. This capability reduces the time it takes for a user to perform tasks, makes tasks more natural to the driver, and reduces cognitive demand on the driver.

SUMMARY OF THE INVENTION

The shortcomings of the prior art are overcome and additional advantages are provided through the provision of a method for state transition in voice systems, the method comprising: generating one or more stackable state macros, each of the one or more stackable state macros including a plurality of commands; saving a current state before executing another macro; enabling restoring a previous state after the plurality of commands are completed; and allowing a user to utter voice commands to restore an individual state of the voice systems as a whole to the previous state or to a known home state.

The shortcomings of the prior art are overcome and additional advantages are provided through the provision of a system for state transition in voice systems, the system comprising: a network; and a host system in communication with the network, the host system including software to implement a method comprising: generating one or more stackable state macros, each of the one or more stackable state macros including a plurality of commands; saving a current state before executing another macro; enabling restoring a previous state after the plurality of commands are completed; and allowing a user to utter voice commands to restore an individual state of the voice systems as a whole to the previous state or to a known home state.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method for generating, saving, and restoring stackable state macros in voice systems.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a method for enhancing environment voice macros via a stackable save/restore state of an object within an environment controlled by voice commands.

The exemplary embodiments of the present invention illustrate a set of related methods by which embedded voice systems allow one or more users of a system to enter and exit modes in a natural and flexible manner. Traditional approaches have explored methods of aggregating commands as scripts (timed), macros (sequential), and actions (asynchronous). These approaches allow the driver (user) or the manufacturer to define a set of actions associated with context in advance of the situation.

For example, the driver of a vehicle heading toward a tollbooth can define the end state sought for "Tollbooth." This end state might consist of the commands: open driver's side window, inactivate wipers, and turn off or mute the radio. The command "Tollbooth" would set everything to this pre-specified state. Since the goal is to achieve a state, only necessary actions are invoked. Thus, if the radio were already silent, this command would not affect the radio.

In a first exemplary embodiment, a set of pre-packaged commands is defined, which coordinates a set of actions necessary to achieve a specified state and then teaches these commands to the user. For instance, an in-vehicle system may ship with "Phone" mode and "Off-road" modes. Perhaps the "Phone" command returns the vehicle to a state in which the windows are raised fully, the radio is muted, and the air or heat fan is no higher than at blower level 2 (since level 4 is noisy). By this first method, the manufacturer pre-packages a set of commands rather than allowing the user to define such commands. Themes are a special variation of the first method in which the pre-packaged commands invoke a set of coordinated items.

In a second exemplary embodiment, the user is permitted to save the current system state (through a voice command or other interaction) and return to this saved state through a voice command. The save and restore commands may function in collaboration with or independent of the previous method. For example, the user might recite, "Save car" or "Save state." The user could then make a series of changes to the system (e.g., a vehicle) through a single command, through multiple commands, or through interactions with physical system controls. Once the user is ready to return to the previous state, he/she could issue a command such as "Restore," which would restore all the settings to the saved state. This feature is helpful for temporary context changes, such as the tollbooth scenario. In other words, a driver may change from high-speed expressway driving to a motionless state in which he needs to communicate with and interact with another individual and then return to his original context.

In a third exemplary embodiment, an additional feature such that activating any mode automatically saves the system's current state is presented. This feature accomplishes principle usability goals in that it relieves the user's memory workload (users no longer are required to remember to explicitly save state) and reduces necessary user interactions (thus reducing cognitive demands and potential failure points). A global command such as "End mode" would always return the system to the state that it held immediately prior to mode activation. This restoration concerns those settings associated with the onset of the mode. In other words, if "tollbooth mode" turns wipers off, mutes radio, and lowers driver's window, then the driver turns the AC up (manually or via a voice command), and then saying "End mode" would restore the window, radio, and wipers, but would not affect the AC settings.

A fourth exemplary embodiment provides the user with a known state to which the user can return. This is a method by which the system automatically sets or allows the user to set a "Home" mode, which can be returned to at any time, for example, by giving a "Home" command. For an in-vehicle system, the "Home" mode could be the vehicle start up state or a state that occurs 2 minutes into the drive (presumably the point at which the driver becomes comfortable), etc. Another option is to allow the user a method of specifically setting "Home" mode at any point during the drive. This could be set through a voice command, through interaction with a push-to-talk button, or through any other control. Alternatively, the user could set a "Home" mode that is similar to that described in the first method (this mode would always be available and would remain constant unless the user specifically updated it) and a "Trip" mode which has the characteristics described above with reference to method four.

A fifth exemplary embodiment allows the user to nest modes and commands. This method further allows the user to alter individual settings without releasing the current mode. For example, the driver could return to "Home" mode, but then also mute the radio (assume Home mode plays radio at a certain volume setting), without exiting home mode.

Note that although the description above applies to in-vehicle voice systems, these same capabilities could greatly benefit users of a variety of speech-enabled entities, such as a television or a "smart house." The applications are described with reference to FIG. 6 described below.

Figure 1:
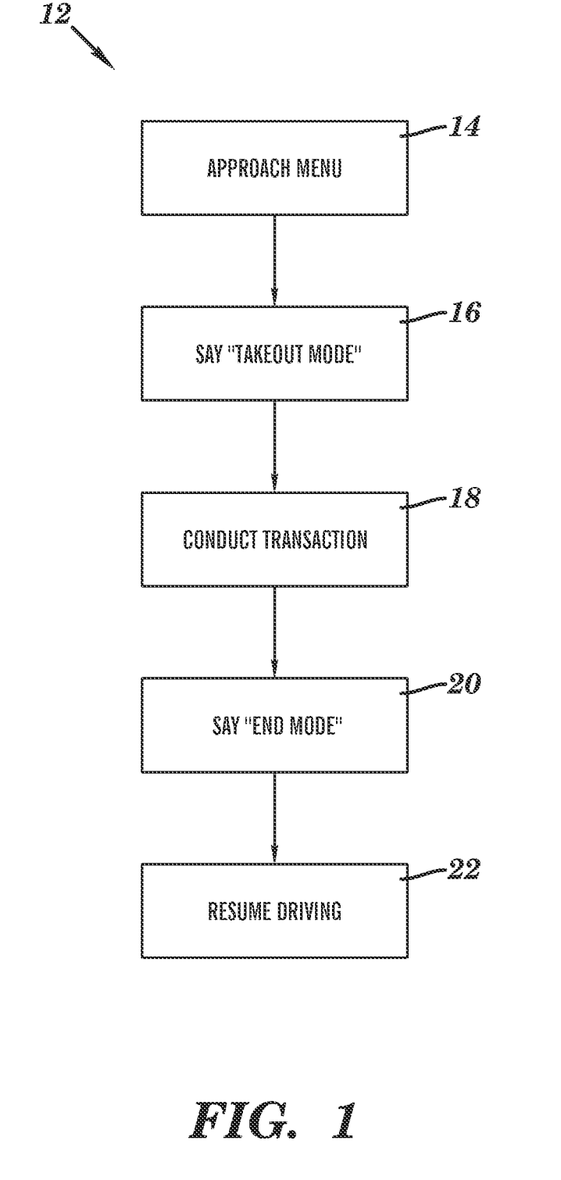
FIG. 1 illustrates one example of a flow diagram illustrating a system of enhancing environment voice macros.

Referring to FIG. 1, one example of a flowchart illustrating system of enhancing environment voice macros is described. In the exemplary embodiments of the present invention, the proposed system 12 commences at an approach menu 14. The commands open window, turn down radio, and turn off wipers are bundled together in a takeout mode command 16, where all three commands are executed simultaneously by allowing the user to utter only one voice activation phrase. The command prompt conduct transaction 18 executes the takeout mode command 16. After a user prompts the system to execute the commands by uttering "takeout mode," the user is then in a position to restore the system into its original state by voice activation. The commands restore wipers, restore radio, and close window are bundled together and restored by allowing the user to utter "end mode" at the end mode 20 step. Thus, all three commands are executed simultaneously by allowing the user to utter only one voice activation phrase. Once these commands are executed, the user may resume driving 22.

Figure 2:
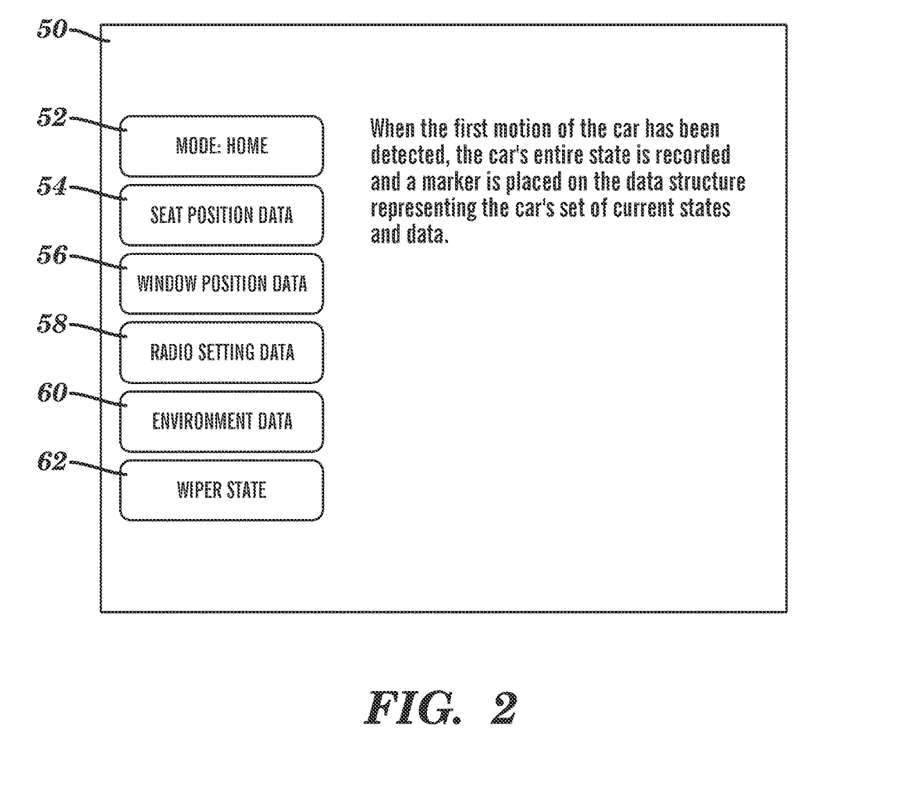
FIG. 2 illustrates one example of how states of a system are stacked or nested according to the exemplary embodiments of the present invention.

Referring to FIG. 2, one example of how states of a system are stacked or nested according to the exemplary embodiments of the present invention is illustrated. In FIG. 2, when the first motion of the vehicle has been detected, the vehicle's entire state is recorded and a marker is placed on the data structure 50 representing the vehicle's set of current states and data. The state of a vehicle may be MODE: HOME 52, Seat Position Data 54, Window Position Data 56, Radio Setting Data 58, Environment Data 60, and Wiper State 62.

Figure 3:
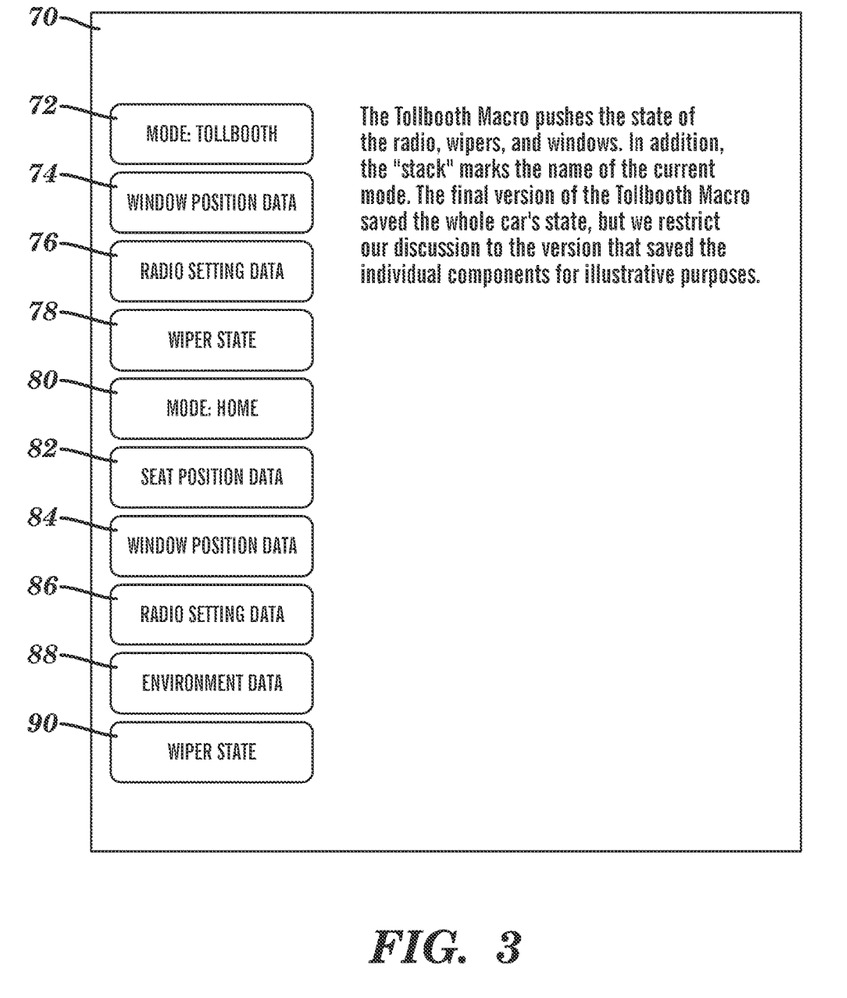
FIG. 3 illustrates one example of how states of a system are stacked or nested, and shifted as a macro is added according to the exemplary embodiments of the present invention.

Referring to FIG. 3, one example of a how states of a system are stacked or nested, and shifted as a macro is added according to the exemplary embodiments of the present invention is illustrated. In FIG. 3, a tollbooth macro pushes the state of the radio, wipers, and windows. In addition, the stack 70 marks the name of the current mode. The final version of the tollbooth macro saves the entire vehicle's state. The tollbooth macro includes the states MODE: Tollbooth 72, Window Position Data 74, Radio Setting Data 76, and Wiper State 78. The home macro includes MODE: HOME 80, Seat Position Data 82, Window Position Data 84, Radio Setting Data 86, Environment Data 88, and Wiper State 90.

Figure 4:
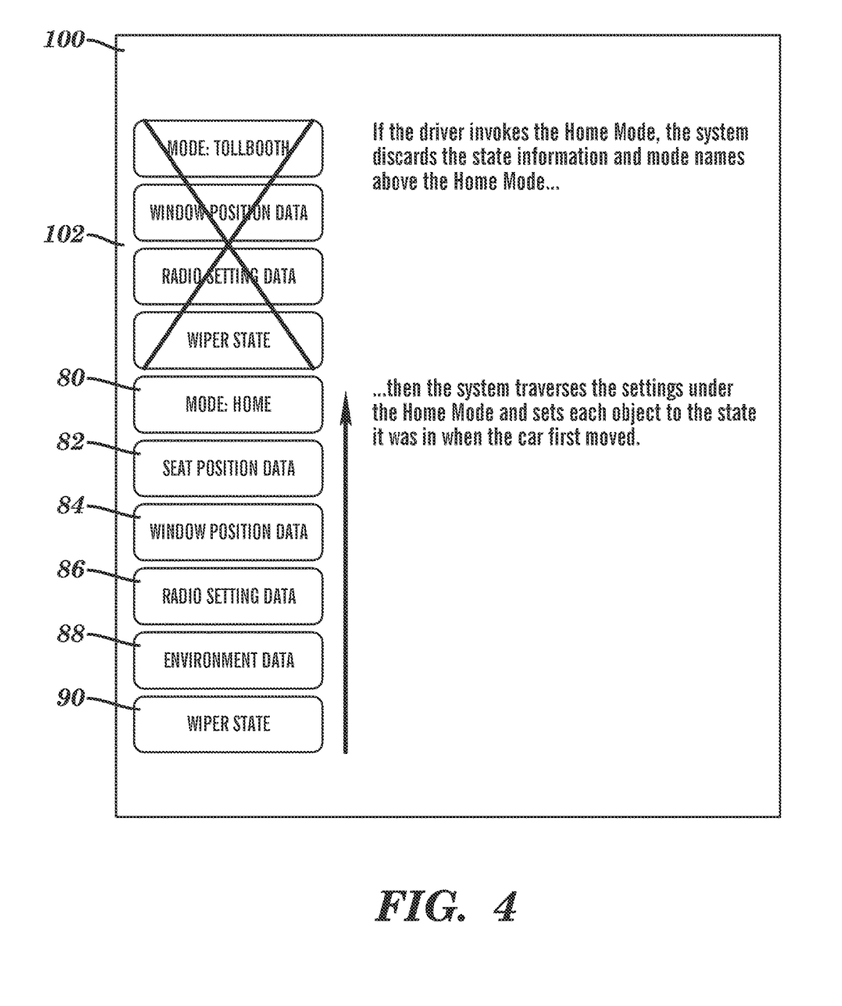
FIG. 4 illustrates one example of a user invoking one macro of the system according to the exemplary embodiments of the present invention.

Referring to FIG. 4, one example of a user invoking one macro 100 of the system according to the exemplary embodiments of the present invention is illustrated. In FIG. 4, when the user invokes the home mode, the system discards the state information and mode names of the tollbooth macro 102. Then the system traverses the settings under the home mode and sets each object to the state it was in when the vehicle first moved. The home macro includes MODE: HOME 80, Seat Position Data 82, Window Position Data 84, Radio Setting Data 86, Environment Data 88, and Wiper State 90.

Figure 5:
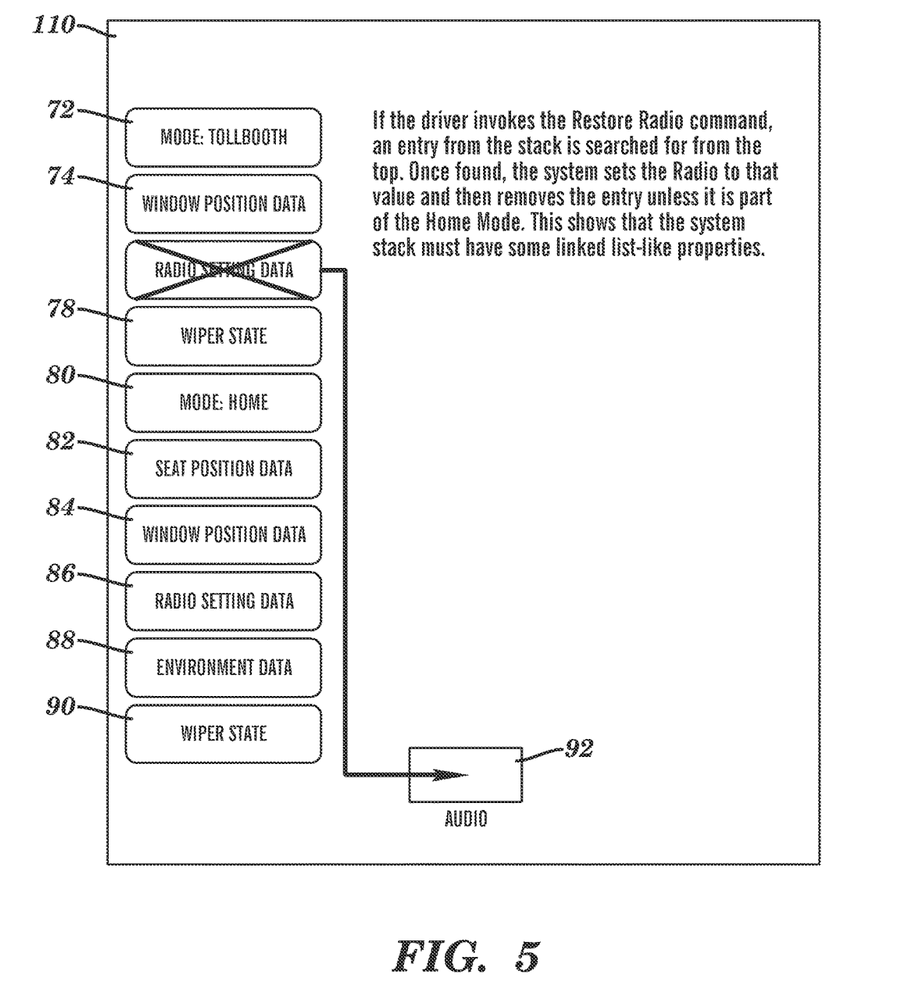
FIG. 5 illustrates one example of a user invoking one command from a macro according to the exemplary embodiments of the present invention.

Referring to FIG. 5, one example of a user invoking one command from a macro according to the exemplary embodiments of the present invention is illustrated. In FIG. 5, if the user invokes the Restore radio command, an entry from the stack 110 is searched for from the top. Once found, the system sets the Radio 92 to that value and then removes the entry unless it is part of the home mode. This illustrates that the system stack has some linked list like properties. The home macro includes MODE: HOME 80, Seat Position Data 82, Window Position Data 84, Radio Setting Data 86, Environment Data 88, and Wiper State 90.

Figure 6:
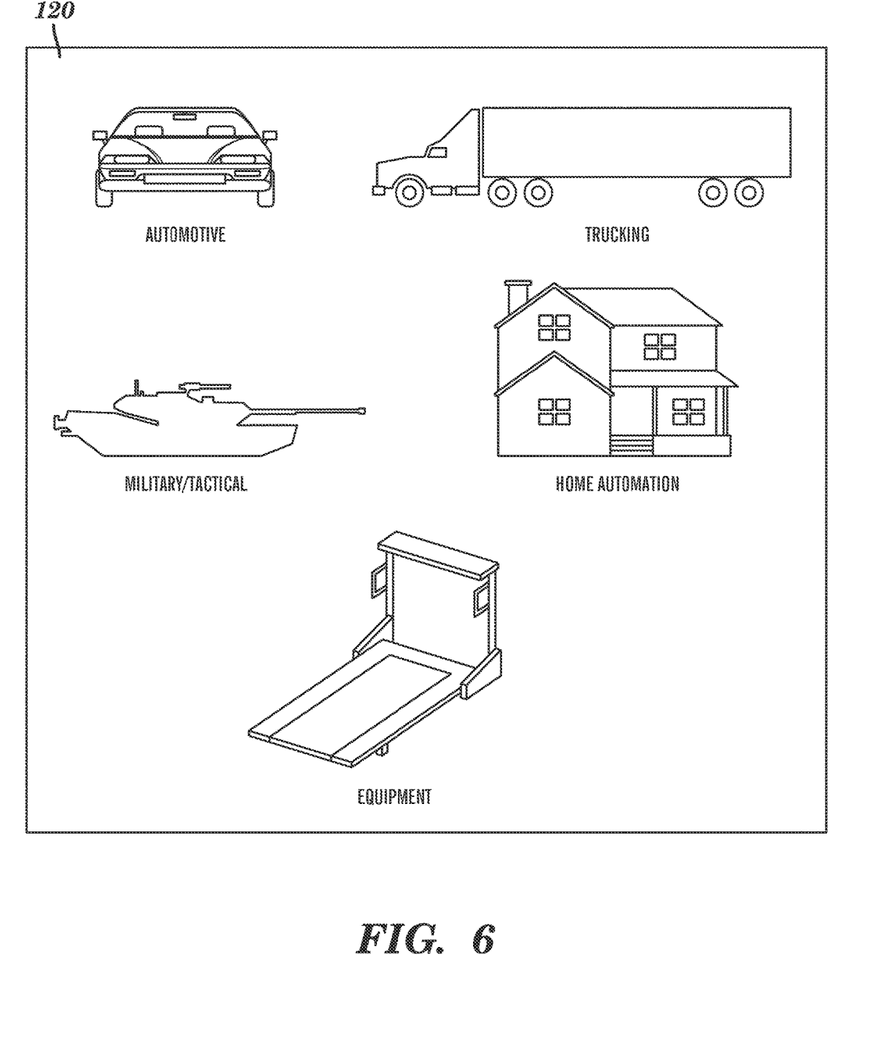
FIG. 6 illustrates one example of areas of application of systems enhancing environment voice macros according to the exemplary embodiments of the present invention.

Referring to FIG. 6, one example of areas of application of systems enhancing environment voice macros 120 according to the exemplary embodiments of the present invention is illustrated. The systems include automotive systems, trucking systems, military/tactical systems, home automation systems, and home equipment systems.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of automatically controlling a plurality of components of a vehicle in an in-vehicle system comprising at least one processor capable of controlling the plurality of components, the in-vehicle system storing a plurality of macros, each of the plurality of macros specifying a plurality of preset commands corresponding to the control of at least one of the plurality of components, each of the plurality of components having at least one parameter according to which the respective component may be configured, the system having a current state characterized by values at which the at least one parameter of each of the plurality of components are set at a given moment in time, the method comprising:

in response to receiving a first voice command to execute a first macro and before executing the first macro, automatically saving, upon receiving the first voice command, a current state of the system when the first voice command is received, by storing values at which at least one parameter of each of the plurality of components were set when the first voice command was received, the first macro including a plurality of commands that instruct the system to change the at least one parameter of at least one of the plurality of components to a specified value such that, when the first macro is executed by the system, a state transition of the system from the current state to a different state characterized by a different resulting configuration of the plurality of components is achieved;

executing the first macro to transition the system from the current state to the different state; and in response to receiving a second voice command to restore the current state, restoring the system to the current state that was automatically saved upon receiving the first voice command and prior to executing the first macro, wherein the plurality of components capable of being controlled comprises at least two of: at least one window; a sound system; windshield wipers; an air conditioning unit; a heating unit; and at least one seat, wherein the second voice command is not specific to the current state.

2. The method of claim 1, wherein saving the current state comprises saving a current state of each of the plurality of components of the vehicle.

3. The method of claim 2, further comprising returning the plurality of components to the saved current state of each of the plurality of components of the vehicle in response to receiving a voice command to restore the saved state of the vehicle.

4. The method of claim 1, wherein the current state comprises start-up of the vehicle.

5. The method of claim 1, wherein the current state comprises an elapsing of a predetermined interval of time after start-up of the vehicle.

6. The method of claim 1, wherein the current state has no voice command associated solely with the current state.

7. An apparatus for use in an in-vehicle system having a plurality of components, each of the plurality of components having at least one parameter according to which the respective component may be configured, the system comprising a current state characterized by values at which the at least one parameter of each of the plurality of components are set at a given moment in time, the apparatus comprising:

at least one input to receive voice commands from a user; and at least one host computer configured to control state transitions of the system, the at least one host computer programmed to:

in response to receiving a first voice command to execute a first macro and before executing the first macro, automatically saving, upon receiving the first voice command, a current state of the system when the first voice command is received, by storing values at which at least one parameter of each of the plurality of components were set when the first voice command was received, the first macro including a plurality of commands that instruct the system to change the at least one parameter of at least one of the plurality of components to a specified value such that, when the first macro is executed by the system, a state transition of the system from the current state to a different state characterized by a different resulting configuration of the plurality of components is achieved;

execute the first macro to transition the system from the current state to the different state; and in response to receiving a second voice command to restore the current state, restore the system to the current state that was automatically saved upon receiving the first voice command and prior to executing the first macro, wherein the plurality of components capable of being controlled comprises at least two of: at least one window; a sound system; windshield wipers; an air conditioning unit; a heating unit; and at least one seat, wherein the second voice command is not specific to the current state.

8. The apparatus of claim 7, wherein the current state has no voice command associated solely with the current state.

9. At least one non-transitory computer readable medium storing instructions that, when executed by at least one processor, perform a method of controlling state transitions in an in-vehicle system having a plurality of components, each of the plurality of components having at least one parameter according to which the respective component may be configured, the method comprising:

in response to receiving a first voice command to execute a first macro and before executing the first macro, automatically saving, upon receiving the first voice command, a current state of the system when the first voice command is received, by storing values at which at least one parameter of each of the plurality of components were set when the first voice command was received, the first macro including a plurality of commands that instruct the system to change the at least one parameter of at least one of the plurality of components to a specified value such that, when the first macro is executed by the system, a state transition of the system from the current state to a different state characterized by a different resulting configuration of the plurality of components is achieved;

executing the first macro to transition the system from the current state to the different state; and in response to receiving a second voice command to restore the current state, restoring the system to the current state that was automatically saved upon receiving the first voice command and prior to executing the first macro, wherein the plurality of components capable of being controlled comprises at least two of: at least one window; a sound system; windshield wipers; an air conditioning unit; a heating unit; and at least one seat, wherein the second voice command is not specific to the current state.

10. The at least one non-transitory computer readable medium of claim 9, wherein the current state has no voice command associated solely with the current state.

* * * * *